United States Patent [19]

Kulikowski et al.

[11] Patent Number: 4,907,630

[45] Date of Patent: Mar. 13, 1990

[54] AUTOMATIC SHUT-OFF AND SELF-LOCKING REFUELING NOZZLE

[75] Inventors: Ernest F. Kulikowski, Marshall; Paul J. E. Fournier, Jackson, both of Mich.

[73] Assignee: Aeroquip Corporation, Jackson, Mich.

[21] Appl. No.: 160,270

[22] Filed: Feb. 25, 1988

[51] Int. Cl.⁴ ............................................. B65B 3/04
[52] U.S. Cl. ............................... 141/384; 141/311 R; 141/346; 141/382; 141/385; 285/360
[58] Field of Search ............... 141/382, 383, 384, 385, 141/386, 192, 198, 311 R, 312, 346, 347, 392, 206–210, 211, 217–219, 225–229; 285/358, 360, 361, 362, 396; 220/85 R, 86 R

[56] References Cited

U.S. PATENT DOCUMENTS

| | | | |
|---|---|---|---|
| 2,047,580 | 7/1936 | Dewey | 141/310 X |
| 2,319,567 | 5/1943 | Vegell | 141/310 X |
| 2,545,233 | 3/1951 | Kaufman | 141/302 |
| 2,680,030 | 6/1954 | Hoelzer | 141/384 |
| 2,737,401 | 3/1956 | Lindsay | 141/384 |
| 3,045,721 | 7/1962 | Shepherd et al. | 141/384 X |
| 3,330,313 | 7/1967 | Rosell | 141/384 |
| 3,674,061 | 7/1972 | Calisher et al. | 141/198 |
| 3,990,490 | 11/1976 | Voelz | 141/311 R |
| 4,109,686 | 8/1978 | Phillips | 141/1 |
| 4,512,379 | 4/1985 | Hennig | 141/286 |
| 4,515,245 | 5/1985 | Salmon | 141/392 X |
| 4,711,277 | 12/1987 | Clish | 141/392 |

Primary Examiner—Ernest G. Cusick
Attorney, Agent, or Firm—Beaman & Beaman

[57] ABSTRACT

The invention pertains to an automatic shut-off refueling nozzle particularly suitable for use with military vehicles employing a nozzle having a liquid level sensor operating a flow valve, the nozzle includes a lug plate attachable to the inlet of the tank receptacle being filled wherein once attached to the tank inlet the presence of an operator is not required during refueling. A diverger on the nozzle spout improves flow characteristics within the tank inlet to prevent premature release of the nozzle flow valve and the nozzle prevents contamination during refueling and prevents spillage of volatile fuels even though unattended. An embodiment of the invention utilizes a secondary control valve preventing fluid flow until the nozzle has been fully connected to the tank inlet.

13 Claims, 2 Drawing Sheets

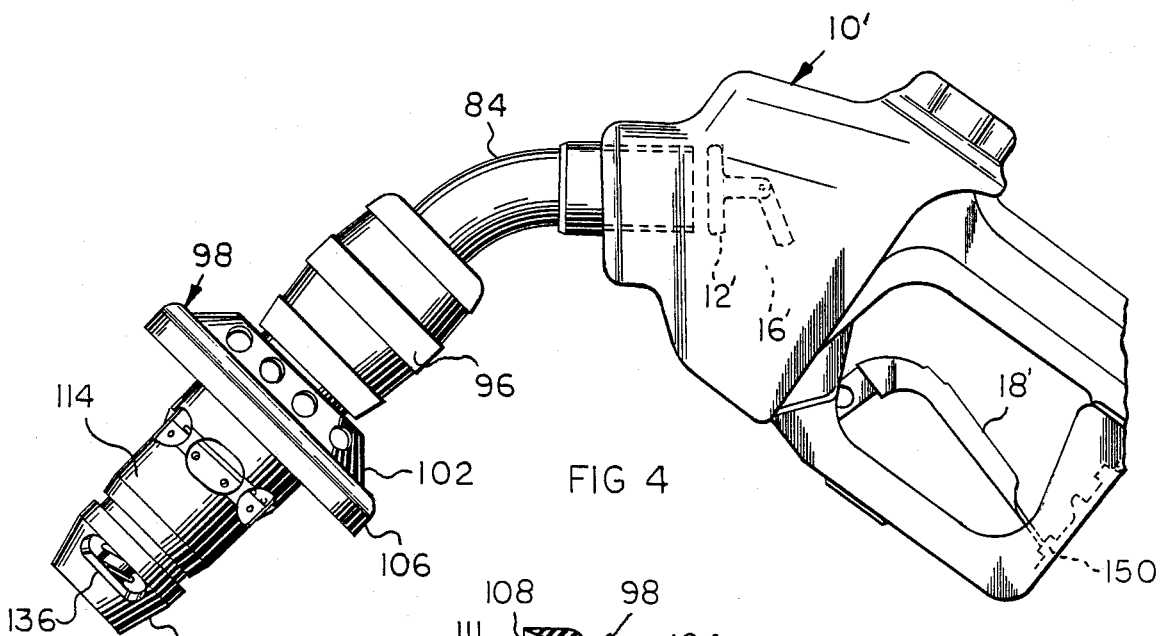
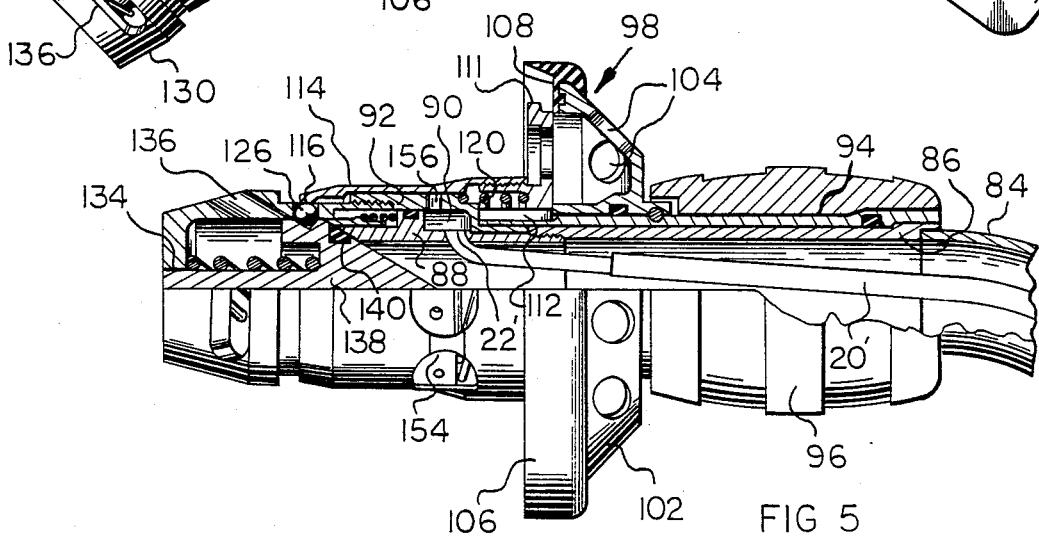
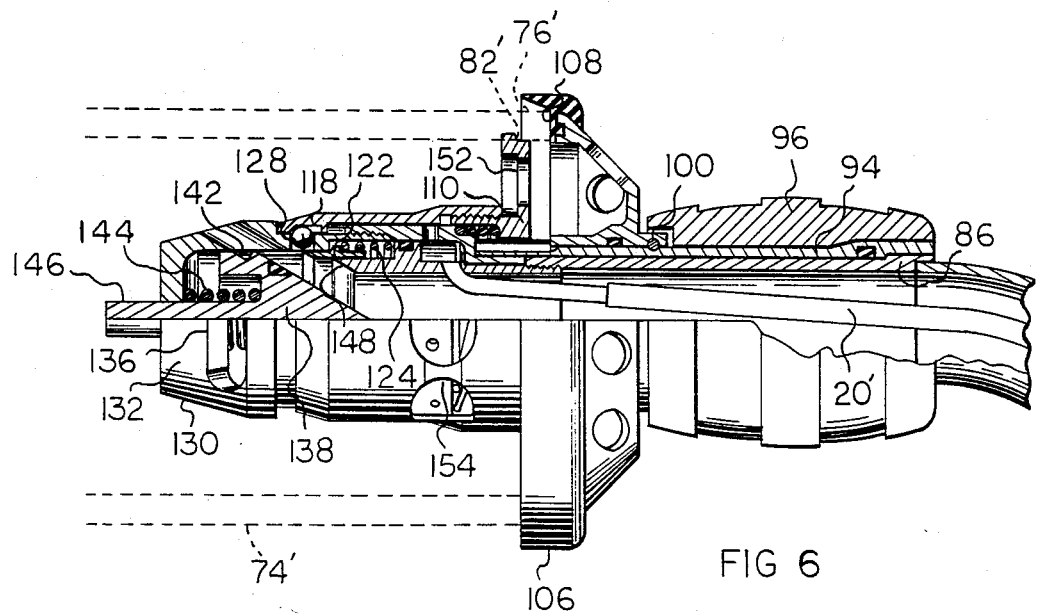

AUTOMATIC SHUT-OFF AND SELF-LOCKING REFUELING NOZZLE

BACKGROUND OF THE INVENTION

The refueling of vehicles, both in civilian and military usage, usually employs a supply hose having a manually operated nozzle having a spout insertable into the vehicle tank inlet neck through an inlet port. The nozzle valve is manually operated by a handle, and a tube within the spout senses the rising fuel within the inlet neck and automatically closes the nozzle valve upon sensing the presence of the fuel level to prevent overflow and spillage.

In military usage it is sometimes desirable that refueling of the vehicle occur while the vehicle engine is operating, and in such instance it is most important that fuel spillage be prevented. Furthermore, during military operations it may be necessary to refuel vehicles in unsecured locations where it is not desirable for the operator to be exposed to possible enemy fire for as long as a refueling operation may require.

While refueling nozzles are available which may not require the immediate attention of an operator, such nozzles must employ an automatic shut-off actuator to prevent overfilling, and premature operation of the automatic fuel level sensing shut-off apparatus often occurs which requires extra attention by the operator subjecting the operator to possible danger.

It is an object of the invention to provide automatic shut-off refueling nozzle structure utilizing an automatic fluid flow shut-off sensor wherein the nozzle valve is not prematurely actuated due to false back pressures within the tank inlet.

Another object of the invention is to provide a refueling nozzle having an automatic shut-off operation wherein dependable operation is achieved and contamination and spillage are prevented.

Yet another object of the invention is to provide an automatic shut-off refueling nozzle wherein spillage is prevented even though refueling occurs without attention by the operator.

A further object of the invention is to an provide automatic refueling nozzle employing a diverger for distributing nozzle flow to prevent premature valve actuation and wherein a secondary control valve is located within the diverger and is maintained in a closed condition until the nozzle is fully connected to the tank inlet.

In the practice of the invention a conventional automatic shut-off refueling valve is utilized in conjunction with spout-mounted structure achieving the purposes of the inventive concepts. The nozzle employed with both of the disclosed embodiments of the invention is of the conventional type such as used in civilian service stations wherein the nozzle is supplied with fuel under pressure through a hose and a manually operated trigger-type valve controls flow through the nozzle spout upon the spout being inserted into the fuel tank neck through the neck port. A sensing tube within the spout having an open end adjacent the spout end senses the presence of rising fuel at the spout end and through conventional back pressure sensing and actuation means closes the nozzle valve to prevent spillage.

The structure of the invention is mounted upon the spout and includes a lug plate concentrically rotatably mounted upon the spout having lug projections for cooperating with recesses and cam surfaces defined on the tank inlet neck port. Insertion of the spout end into the tank inlet neck port permits the lugs on the lug plate to engage the port recesses and rotation of the lug plate engages the lugs with the port cam surfaces to provide a positive connection between the lug plate and the tank neck end port.

Sealing structure is mounted upon the spout in proximity to the lug plate wherein the end of the tank neck at the port sealingly engages cap or cover structure mounted on the nozzle spout to prevent contamination of the fuel during filling. A vent passage defined through the lug plate permits venting of the tank during filling and the vent structure is so located as to prevent contamination.

As a nozzle in accord with the invention is used to refuel vehicles while the engine is running, and may be refueling military vehicles while the vehicles are under enemy fire, and the operator is taking cover, it is important that premature automatic closing of the nozzle during refueling does not occur. Such valve closing will occur if the flow of fuel into the fuel tank neck is such as to create a back pressure. To avoid premature nozzle shut-off a diverger is mounted upon the end of the spout structure having a plurality of orifices defined therein through which the fuel flows during operation. The orifices within the diverger are obliquely related to the axis of the tank neck and distribute the fuel flowing into the tank neck in such a manner as to prevent back pressure and premature nozzle valve closure.

In an embodiment of the invention a control valve is located within the diverger to prevent contamination of the spout when not in use, and close the orifices of the diverger with respect to the spout interior during non-use. The control valve within the diverger is biased in a closed direction by a low pressure compression spring, and fluid flow through the spout will compress the spring and shift the control valve to an open condition permitting flow from the spout and through the diverger. The control valve is held in a closed condition by a plurality of radially displaceable detent balls held in a locked condition within the diverger and engaging the control valve by a retainer connected to the lug plate.

Upon the lug plate being rotated to the fully connected relationship to the tank inlet port the retainer releases the detents and thereby releases the control valve for displacement by the flowing fluid. Upon the termination of fuel flow the compression spring shifts the control valve to its closed position and upon the lug plate being rotated to permit release of the nozzle structure from the fuel tank port the detents will engage the control valve to lock it in the closed condition.

BRIEF DESCRIPTION OF THE PREFERRED EMBODIMENT

The aforementioned objects and advantages of the invention will be appreciated from the following description and accompanying drawings wherein:

FIG. 1 is an elevational view, partially in section, illustrating a nozzle utilizing the apparatus of the invention, as taken along Section I—I of FIG. 2, and illustrating the nozzle in alignment with a typical fuel tank inlet neck and port, FIG. 2 is an elevational, sectional view as taken along Section II—II of FIG. 1, FIG. 3 is an end elevational view of the tank inlet neck and port, FIG. 4 is an elevational view of another embodiment of automatic shut-off nozzle in accord with the invention, FIG. 5 is an enlarged, detail, partially sectioned, elevational view of the spout, spout connection structure, and diverger of the embodiment of FIG. 4 illustrating the components in the nonuse condition, and FIG. 6 is an elevational, partially sectioned view similar to FIG. 5 illustrating the components in the operative fuel flowing condition as connected to a tank inlet port.

DESCRIPTION OF THE PREFERRED EMBODIMENTS

Figure 1:
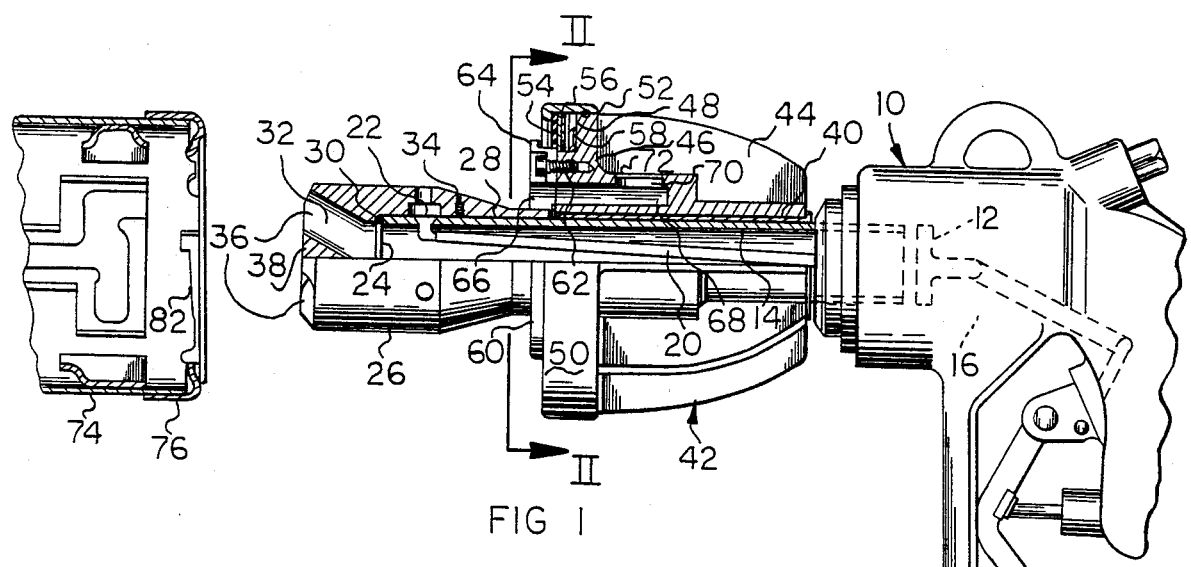

As represented in FIG. 1, a conventional automatic shut-off nozzle is represented at 10. This nozzle is of a conventional type, as used with civilian and military refueling systems and includes a shut-off valve 12 controlling fluid flow through a spout 14. The valve 12 is in communication with a pressurized fuel source such as a hose, not shown, via the chamber 16 defined in the nozzle and the manual position of the valve is determined by the trigger-type handle 18. A sensing conduit 20 is located in the spout 14 having a port 22 communicating with the outer surface of the spout and the conduit 20 communicates with pressure differential sensing structure within the nozzle 10, not shown, wherein the presence of a predetermined back pressure within the conduit 20 causes the valve 12 to automatically close regardless of the position of the valve operating handle 18. The aforementioned structure is commonly used in the fueling of vehicles to prevent spillage, and forms no part of the present invention.

The spout 14 comprises a cylindrical conduit having an open end 24, and a diverger 26 is mounted upon the spout open end to improve the fuel discharge flow characteristics. The diverger 26 includes an inner cylindrical bore 28 closely receiving the spout end and an annular sealing ring 30 establishes a fluid-tight seal relationship between the spout and diverger. The diverger includes a radial port 32 communicating with the nozzle back pressure conduit port 22 so as to establish communication between the conduit and the outer surface of the diverger, and a set screw 34 bears against the spout end and affixes the diverger in place. A plurality of orifices 36, usually three, are defined in the diverger circumferentially evenly spaced thereabout and the diverger orifices intersect the diverger end surface 38, and communicate with the end of the spout. As will be appreciated in FIG. 1, the axis of the orifices 36 is obliquely related to the axis of the spout and in this manner the fuel flowing through the diverger will be projected away from the nozzle and in an oblique outward direction against the walls of the tank inlet neck as later described.

The nozzle connection means includes synthetic plastic bearing sleeve 40 is mounted upon the spout adjacent the nozzle and the cap 42 is rotatably mounted upon the bearing sleeve. The cap 42 includes a cylindrical bore closely receiving the bearing, and a plurality of radially extending vanes 44 extend from the cap hub. The cap includes a radially extending flange portion 46 having an annular recess 48 defined therein. An annular retainer 50 is located upon the periphery of the cap flange 46 and is held in position by a drive wire 52 received within aligned recesses within the interior of the retainer and the exterior of the cap flange. Sealing structure is located within the cap recess 48 and includes a gasket 54, an annular piston 56, and an annular wave spring 58 engaging the radial face of the recess biases the piston to the left to impose a biasing force on the resilient gasket 54. The retainer 50 includes an annular shoulder for confining the gasket within the recess.

Figure 2:
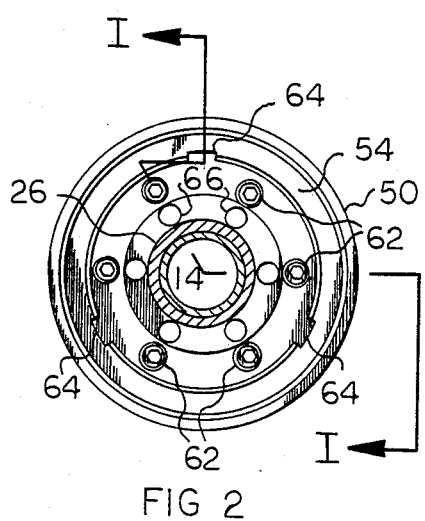

A lug plate 60 is attached to the cap hub by six cap screws 62 and the lug plate includes three radially extending lugs 64, FIG. 2, spaced at 120° locations about the periphery of the lug plate. The lug plate is provided with six axial holes 66 communicating with axial vent passages 68 defined in the cap 42 which intersect the cap vent ports 70. The vent ports are each closed with a screen 72 to prevent foreign particles from entering the fueling system.

Figure 3:
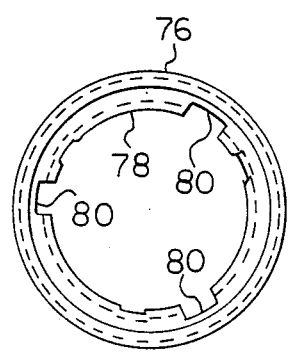

The vehicle fuel tank to be refueled, not shown, includes an inlet neck 74, FIG. 1, having a port retainer 76 defined at its open end. The port retainer includes a bore 78, FIG. 3, having three notches 80 defined therein for receiving the lugs 64. A cam surface 82, FIG. 1, is defined in the port retainer adjacent each of the notches having a surface obliquely related to the axis of the neck 74. Thus, upon the lugs 64 being inserted through the notches 80, rotation of the lug plate 60 causes the lugs to ride upon the cam surfaces 82.

In use, the nozzle structure is aligned with the tank inlet neck 74 as shown in FIG. 1. The diverger 26 is inserted into the port retainer bore 78 until the lugs 64 engage the port retainer 76. Thereupon, the operator rotates the cap 42 in a clockwise direction, such rotation being readily facilitated by the rotatable mounting of the cap on the spout by the bearing 40 and the vanes 44. Upon the lugs 64 aligning with the port retainer notches 80 the lugs will enter the notches and continued rotation of the cap engages the lugs with the cam surfaces 82 tightly drawing the spout-mounted structure into the inlet neck and engaging the port retainer with the gasket 54. As the cap is rotated the wave spring 58 will be compressed as the port retainer moves into the recess 48 establishing a fluid-tight relationship between the end of the neck 74 and the cap 42.

The operator may now manually operate the nozzle handle 18 to open the valve 12 and permit fuel flow into the spout 14 and into the tank inlet neck 74 through the diverger orifices 36. As the fuel rapidly flows into the neck 74 through the orifices the fuel will be directed into the neck and against the neck walls away from the ports 32. The valve operating handle will include locking means for holding the actuating handle in an open condition and fuel may now flow at full capacity through the spout 14 into the neck 74 without attention by the operator. As the tank fills the air displaced by the fuel is exhausted from the neck through the vent holes 66 and cap vent passages 68.

Upon the tank filling the rising of the fuel within the neck produces a sufficient back pressure within the conduit 20 to trip the automatic shut-off apparatus closing the valve 12, and no spillage will occur. At his convenience the operator may then disconnect the nozzle 10 from the neck 74 by rotating the cap in a counterclockwise direction to align the lugs 64 with the notches 80 and withdraw the diverger and spout end from the tank neck. The aforementioned apparatus thereby permits refueling without attention by the operator, and premature nozzle valve closing and spillage is eliminated.

A variation of an automatic shut-off refueling nozzle in accord with the inventive concepts is shown in FIGS. 4–6, and in these figures apparatus similar to that previously described is indicated by primed reference numerals.

The spout 84 includes a tubular adapter or extension 86 of a cylindrical configuration and the adapter is internally threaded wherein the plenum 88 is threaded thereto. The automatic shut-off sensing conduit 20' communicates with the annular chamber 90 defined in the plenum and enclosed by the annular union 92 circumscribing the plenum.

An annular sleeve 94 circumscribes and is rotatably mounted upon the adapter 86, and the inner end of the sleeve 94 includes an annular handle 96 affixed thereto whereby the sleeve may be manually rotated by the handle. The exterior surface of the handle is provided with ribs and projections to improve frictional grip.

A cap 98 is affixed to the intermediate portion of the sleeve 94 adjacent the handle 96, and is fixed against axial displacement by the drive wire 100, and is sealed to the sleeve an O-ring. The cap 98 includes a web 102 having a plurality of vent holes 104 defined therein, and at its outer circumference the cap includes an annular bumper 106 formed of an elastomeric material, such as neoprene, and the bumper includes a flat radial sealing surface 108.

An annular lug plate or guide 110 having radial lugs 111 is mounted upon the outer end of the sleeve 94 for axial displacement relative to the sleeve, but the lug plate is keyed to the sleeve by a pair of axially extending dowels 112 whereby rotation of the sleeve produces rotation of the lug plate. An annular detent retainer 114 is threaded upon the lug plate and includes a forwardly extending nose portion having a inner detent retaining surface 116, and a recessed surface 118 radially outwardly spaced from the retaining surface 116. A compression spring 120 interposed between the lug plate and the union biases the lug plate and retainer 114 in a direction toward the cap 98.

An axially displaceable detent lock 122 is located upon the plenum 88 and is biased to the left by compression spring 124. The lock 122 is for the purpose of "lifting" the six detent balls 126 located within the diverger openings 128, as later described.

The hollow diverger 130 is threadedly affixed to the union 92 and includes a conical exterior surface 132, and an axial bore 134. A plurality of flow orifices 136 are defined in the diverger and externally intersect the surface 132, and internally communicate with the bore of the diverger. A spout valve 138 is located within the diverger having a sealing ring 140, and an annular detent receiving groove 142, and the spout valve is biased toward the right by the compression spring 144. The spout valve includes a guide stem 146 reciprocally received within the diverger bore 134. The compression spring 144 is relatively weak, and will compress under the force exerted on the spout valve by fuel flowing through the spout and through the diverger orifices. Upon cessation of fluid flow, the spring 144 will bias the spout valve 138 to the position shown in FIG. 5.

In the inoperative or nonuse condition the nozzle components will be as illustrated in FIG. 5. The spout valve 138 will be biased to the right by spring 144, and the seal ring 140 will engage the oblique valve seat 148 defined at the end of the plenum 88. In this manner the spout valve prevents foreign matter from entering the spout adapter or spout, and prevents any fuel within the spout from escaping. The spout valve 138 is held in its closed condition by the ball detents 126 which will engage the spout valve groove 142, FIG. 5, and will be held in the groove by the surface 116 of the retainer 114. The retainer 114 will be at its rightmost position, FIG. 4, in that the lug plate 110 will be biased to the right by spring 120.

When it is desired to connect the nozzle 10' to the tank inlet neck 74', FIG. 6, the diverger 130 will be aligned with the neck and inserted therein until the lug plate 110 engages the neck port retainer 76'. The lug plate is then rotated by handle 96 to align the lugs 111 with the port notches and continued rotation will cause the lugs to ride upon the inlet neck cams 82'. The cams 82' will, first, force the port retainer 76' into a sealed relationship with the bumper seal surface 108, and continued rotation of the handle 96 will displace the lug plate and retainer 114 to the left as shown in FIG. 6. Upon sufficient axial displacement of the retainer 114 to align the retainer surface 118 with the ball detents 126 the balls will be displaced outwardly by the ball lock 122 under the influence of the spring 124, and the balls will now be held within the diverger openings 128 by the lock 122 and retainer surface 118. Continued rotation of the handle 96 occurs until the lugs 111 have moved the desired distance upon the cam surfaces 82' to tighten the connection. Thereupon, the operator may open the nozzle valve 12' by the actuating handle 18' and the fuel pressure within the spout 84 will displace the spout valve 138 to the left, FIG. 6, permitting fuel to flow through the diverger orifices 136 into the neck 74'. Fueling will then continue automatically, and by the operator using the handle lock 150 unattended fueling is achieved. Vent holes 152 defined in the lug plate will vent the fuel tank to the atmosphere through the cap vent holes 104, and the sensing conduit 20' will sense the pressure, and liquid level, within the neck through the retainer openings 154, the union holes 156, and chamber 90.

Upon the fuel level rising to the retainer openings 154, the sensing conduit 20' will cause the nozzle valve 12' to close and fueling will be completed.

Upon the nozzle valve 12' closing, fluid flow and significant fuel pressure within the adapter 86 ceases permitting the spout valve 138 to be biased toward the right by spring 144, and the spout valve will move to the right engaging the detent lock 122 and displace the lock 122 to the right against spring 124 and seal 140 will seal against seat 148. The handle 96 is then rotated in a counterclockwise direction displacing the lugs 111 along the intake port cams 82' and the spring 120 will move the lug plate 110 toward the cap 98. This movement of the lug plate also displaces the retainer 114 to the right forcing the ball detents 126 inwardly into the spout valve groove 142. Upon complete unlocking rotation of the handle 96 the components will be shown as in FIG. 5 and the nozzle 10' may be removed from the tank inlet neck 74'.

By use of the spout valve 138 and the described structure the embodiment of FIGS. 4-6 will close the nozzle spout when not in use and provide additional protection against spillage and contamination.

It is appreciated that various modifications to the inventive concepts may be apparent to those skilled in the art without departing from the spirit and scope of the invention.

What is claimed is:

1. An automatic shut-off refueling nozzle system characterized by its ability to fill a receptacle unattended wherein the receptacle includes an elongated inlet neck having an inlet port including connection means comprising, in combination, a nozzle connected to a pressurized fuel supply having a spout having an end and an exterior surface, a manually operated valve and a sensing conduit having an open end in communication with said spout exterior surface for automatically closing the nozzle valve upon said conduit open end sensing the presence of fuel adjacent said spout exterior surface, nozzle connection means defined upon said spout for complementary mating with the inlet port connection means when said spout is fully located within the inlet neck, and a diverger communicating with said spout end constituting an extension of said spout wherein said diverger is located within the receptacle inlet neck when said spout is located within the inlet neck, said diverger including an inner chamber in communication with said spout having an axis coaxial with the spout axis, an exterior surface, and at least one discharge orifice defined in said diverger communicating with said chamber and intersecting said diverger exterior surface, said at least one orifice having an axis and direction of discharge away from said spout and obliquely related to said chamber axis and the length of the receptacle inlet neck, said sensing conduit open end being axially located between said at least one diverger orifice and said nozzle connection means.

2. In a refueling nozzle system as in claim 1, said diverger comprising a hollow nose affixed to said spout end.

3. In a refueling nozzle system as in claim 2, a plurality of discharge orifices defined in said diverger each communicating with said chamber and intersecting said diverger exterior surface.

4. In a refueling nozzle system as in claim 1, retainer means mounting said nozzle connection means upon said spout whereby rotation of said nozzle connection means establishes connection to the inlet port connection means.

5. In a refueling nozzle system as in claim 4, a handle defined on said nozzle connection means to facilitate manual rotation of said nozzle connection means.

6. In a refueling nozzle system as in claim 1, said nozzle connection means including a cap having locking projections defined thereon for engaging the inlet port connection means, and a vent defined in said cap venting air forced from the receptacle during refueling to the atmosphere.

7. In a refueling nozzle system as in claim 1, a spout valve within said diverger chamber movable between an open position permitting communication between said at least one discharge orifice and said spout and a closed position closing said at least one discharge orifice relative to said spout, a compression spring within said diverger chamber biasing said spout valve toward said closed position and permitting said spout valve to move to said open position under the influence of flowing fuel through said spout, spout valve locking means mounted upon said spout selectively locking said spout valve in said closed position, and a locking means actuator mounted on said spout controlling said locking means.

8. In a refueling nozzle system as in claim 7, wherein said locking means actuator is associated with said nozzle connection means whereby operation of said nozzle connection means to connect said nozzle to the inlet port simultaneously releases said spout valve locking means.

9. In a refueling nozzle system as in claim 1, said nozzle connection means including a cap rotatably mounted on said spout having a radial face, a lug plate defined on said cap face including lugs for engaging the inlet port connection means, an annular seal defined on said cap face concentric to said spout and resilient means axially biasing said seal toward said lugs whereby rotation of said cap to engage said lugs with the inlet neck port connection means causes the inlet port to engage and displace said seal against said resilient means.

10. In a refueling nozzle system as in claim 9, said resilient means comprising a wave spring.

11. An automatic shut-off refueling nozzle system characterized by its ability to fill a receptacle unattended wherein the receptacle includes an elongated inlet neck having an inlet port including connection means comprising, in combination, a nozzle connected to a pressurized fuel supply having a spout having an end and an exterior surface, a manually operated valve and a sensing conduit having an open end in communication with said spout exterior surface for automatically closing the nozzle valve upon said conduit open end sensing the presence of fuel adjacent said spout exterior surface, a sleeve rotatably mounted on said spout having an inner end disposed toward said valve and an outer end disposed toward said spout end, a handle affixed to said sleeve inner end for rotating said sleeve, a lug plate mounted upon said sleeve outer end for rotation therewith and axially displaceable on said spout, lugs defined on said plate for cooperating with the inlet port connection means whereby rotation of said lug plate relative to the inlet port axially draws the lug plate into the inlet neck, an annular seal axially fixed on said spout adjacent said lug plate for engaging and sealing the inlet port, a hollow diverger affixed to said spout end having at least one orifice defined therein, a spout valve controlling flow through said at least one orifice and axially displaceable within said diverger between orifice open and closed positions, a spring biasing said spout valve toward said closed position and fuel flow through said spout displacing said spout valve to said open position, a detent defined on said diverger selectively locking said spout valve in said closed position, and detent release means operatively connected to said lug plate wherein axial displacement of said lug plate toward said spout end upon connection of said lug plate to the inlet port connection means releases said detent and spout valve to permit said spout valve to be displaced to said open position upon said nozzle valve being opened.

12. In a refueling nozzle system as in claim 11, said lug plate being axially displaceably mounted on said sleeve outer end and keyed to said sleeve for rotation therewith.

13. In a refueling nozzle system as in claim 12, said detent comprising a plurality of radially displaceable balls located within holes defined in said diverger and said detent release means comprising an annular retainer mounted upon said lug plate including a retaining surface for engaging and positioning said balls.

* * * * *